(12) United States Patent
Hayashi et al.

(10) Patent No.: US 9,975,987 B2
(45) Date of Patent: May 22, 2018

(54) EPOXY RESIN, METHOD FOR PRODUCING EPOXY RESIN, CURABLE RESIN COMPOSITION AND CURED PRODUCT THEREOF, FIBER-REINFORCED COMPOSITE MATERIAL, AND MOLDED ARTICLE

(71) Applicant: DIC Corporation, Tokyo (JP)

(72) Inventors: Koji Hayashi, Ichihara (JP); Makoto Kimura, Ichihara (JP); Kunihiro Morinaga, Ichihara (JP); Shigeki Matsui, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days. days.

(21) Appl. No.: 15/127,158

(22) PCT Filed: Mar. 3, 2015

(86) PCT No.: PCT/JP2015/056154
§ 371 (c)(1),
(2) Date: Sep. 19, 2016

(87) PCT Pub. No.: WO2015/146504
PCT Pub. Date: Oct. 1, 2015

(65) Prior Publication Data
US 2017/0121451 A1    May 4, 2017

(30) Foreign Application Priority Data

Mar. 25, 2014 (JP) .................... 2014-061715
Mar. 25, 2014 (JP) .................... 2014-061716
Oct. 10, 2014 (JP) .................... 2014-208984

(51) Int. Cl.
*C08G 59/08* (2006.01)
*C08G 59/32* (2006.01)
(Continued)

(52) U.S. Cl.
CPC ....... *C08G 59/3218* (2013.01); *C08G 59/504* (2013.01); *C08G 59/58* (2013.01); *C08G 59/60* (2013.01); *C08K 7/02* (2013.01)

(58) Field of Classification Search
CPC ..... C08G 59/32; C08G 59/3218; C08L 63/04; C09D 163/04; C09J 163/04; C08J 2363/04; C08J 5/04; C08K 7/02
See application file for complete search history.

(56) References Cited

FOREIGN PATENT DOCUMENTS

| JP | 02-283717 A | 11/1990 |
| JP | 2008-074898 A | 4/2008 |
| JP | 2010-180400 A | 8/2010 |

OTHER PUBLICATIONS

Partial machine translation of JP H02-283717 A.*
International Search Report dated Apr. 28, 2015, issued for PCT/JP2015/056154.

* cited by examiner

*Primary Examiner* — Kregg T Brooks
(74) *Attorney, Agent, or Firm* — Locke Lord LLP

(57) ABSTRACT

Provided is an epoxy resin which has a low viscosity and excellent impregnation capability into reinforcing fibers and provides a cured product having a high elastic modulus and excellent heat resistance when the epoxy resin is used for a fiber-reinforced resin material, and a method for producing the epoxy resin, a curable resin composition, and a cured product thereof, a fiber-reinforced composite material, and a molded article. An epoxy resin which is polyglycidyl ether that is a polycondensation product of phenol and hydroxybenzaldehyde, the resin includes the trinuclear body (X) represented by the following Structural Formula (1), in which the content of a [o,p,p] bonding body (x1) represented by the following Structural Formula (1-1) among the trinuclear body (X) is in the range of 5% to 18% in terms of an area ratio as measured by liquid chromatography.

(1)

(Continued)

-continued
(1-1)
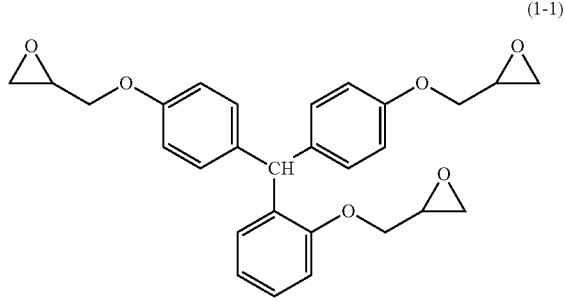
13 Claims, 2 Drawing Sheets
(51) Int. Cl.
*C08G 59/40* (2006.01)
*C08G 59/50* (2006.01)
*C08G 59/60* (2006.01)
*C08K 7/02* (2006.01)
*C08J 5/04* (2006.01)
*C08L 63/00* (2006.01)
*C08G 59/58* (2006.01)

【Fig. 1】
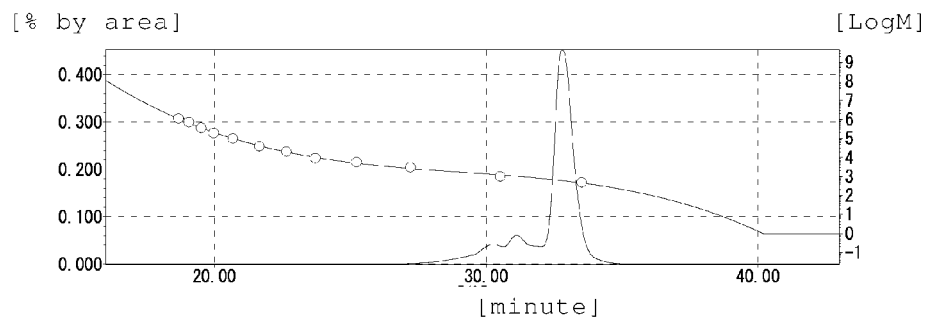
【Fig. 2】
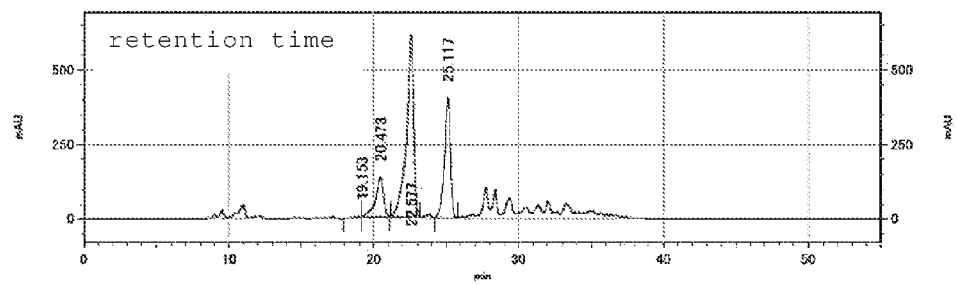
【Fig. 3】
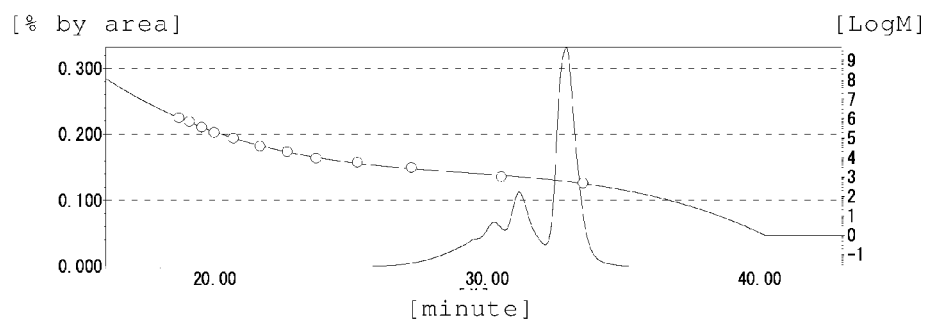

【Fig. 4】
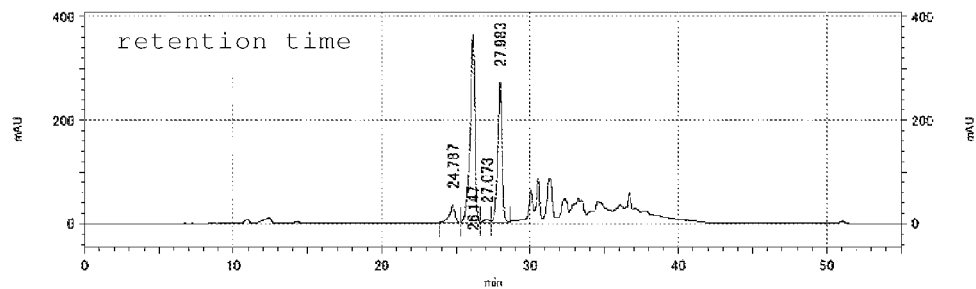
【Fig. 5】
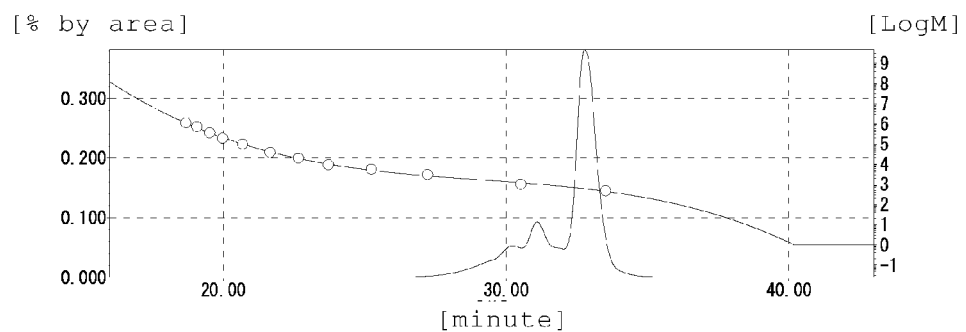
【Fig. 6】
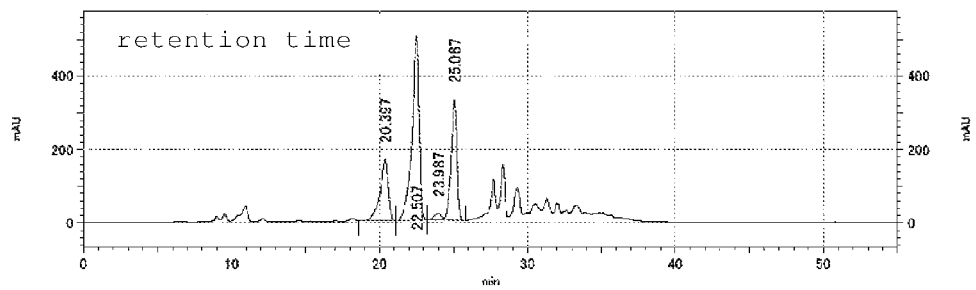

EPOXY RESIN, METHOD FOR PRODUCING EPOXY RESIN, CURABLE RESIN COMPOSITION AND CURED PRODUCT THEREOF, FIBER-REINFORCED COMPOSITE MATERIAL, AND MOLDED ARTICLE

TECHNICAL FIELD

The present invention relates to an epoxy resin which has a low viscosity and excellent impregnation capability into reinforcing fibers and which provides a cured product having a high elastic modulus and excellent heat resistance when the epoxy resin is used fora fiber-reinforced resin material, and a method for producing the epoxy resin, a curable resin composition, and a cured product thereof, a fiber-reinforced composite material, and a molded article.

BACKGROUND ART

Since the features of a fiber-reinforced composite material such as excellent heat resistance or mechanical strength as well as a light weight have been highlighted, the use of a fiber-reinforced composite material for various structures including housings or various members of an automobile or airplane has extended. With respect to a matrix resin of the fiber-reinforced composite material, various performances such as a high impregnation capability into reinforcing fibers, excellent storage stability, and high curing properties without causing voids and excellent heat resistance, mechanical strength, and fracture toughness of a cured product thereof are required. Development of a resin material having an excellent balance between these various performances is required.

As a resin composition having high heat resistance and high toughness, for example, an epoxy resin composition has been disclosed, which contains a trisphenol methane-type epoxy resin in which a ratio of a peak (a), which corresponds to an ortho-orientation skeleton, to a peak (b), which corresponds to a para-orientation skeleton as measured by $^{13}C$-NMR, is 0.25 to 0.27 and a curing agent (PTL 1). However, the impregnation capability into a base material of this curable composition tends to deteriorate as the viscosity is increased, and additionally, a sufficient elastic modulus is not obtained in a cured product.

Meanwhile, as a resin composition having excellent heat resistance and moisture resistance, a novolac resin having a trisphenol methane-type skeleton in which a proportion of an ortho-ortho-ortho bond is 70% by mole or more with respect to all the bonds, and a composition including the novolac resin are disclosed (PTL 2). However, this curable composition does not have sufficient heat resistance when produced as a cured product, and accordingly, is not suitable for an application which requires high heat resistance.

CITATION LIST

Patent Literature

[PTL 1] JP-A-2008-074898
[PTL 2] JP-A-2010-180400

SUMMARY OF INVENTION

Technical Problem

An object of the present invention is to provide an epoxy resin which has a low viscosity and excellent impregnation capability into reinforcing fibers and which provides a cured product having a high elastic modulus and excellent heat resistance when the epoxy resin is used for a fiber-reinforced resin material, and a method for producing the epoxy resin, a curable resin composition, and a cured product thereof, a fiber-reinforced composite material, and a molded article.

Solution to Problem

As a result of a thorough study for solving the aforementioned problem, the present inventors have found that in an epoxy resin obtained by performing polyglycidyl etherification of a polycondensation product of phenol and hydroxybenzaldehyde, an appropriate adjustment of the content of a [o,p,p] bonding body (x1) represented by the following Structural Formula (1-1) in all the three-nuclear body components provides an epoxy resin which has a low viscosity and excellent impregnation capability into reinforcing fibers and which provides a cured product having a high elastic modulus and excellent heat resistance when the epoxy resin is used for a fiber-reinforced resin material, thereby completing the present invention.

[Chem. 1]

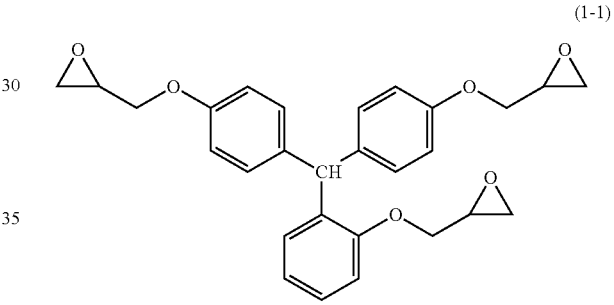

(1-1)

In other words, the present invention relates to an epoxy resin which is a polyglycidyl ether that is a polycondensation product of phenol and hydroxybenzaldehyde, the resin including a trinuclear body (X) represented by the following Structural Formula (1):

[Chem. 2]

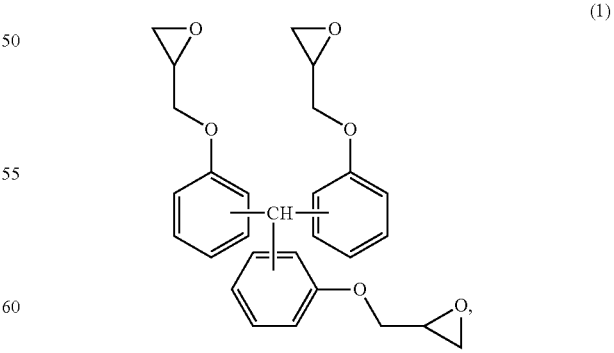

(1)

with the content of a [o,p,p] bonding body (x1) represented by the following Structural Formula (1-1) among the trinuclear body (X) being in the range of 5% to 18% in terms of an area ratio as measured by liquid chromatography.

[Chem. 3]

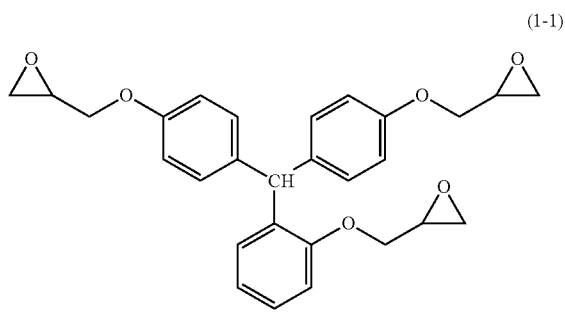

(1-1)

Furthermore, the present invention relates to a method for producing an epoxy resin including: reacting phenol with ortho-hydroxybenzaldehyde in a molar ratio between the both (phenol:hydroxybenzaldehyde) being 1:0.05 to 1:0.25 to thereby obtain a phenolic resin intermediate; and reacting the obtained phenolic resin intermediate with epichlorohydrin.

Furthermore, the present invention relates to a curable resin composition including the epoxy resin; and a curing agent.

Furthermore, the present invention relates to a cured product formed by curing the curable resin composition.

Furthermore, the present invention relates to a fiber-reinforced composite material including the epoxy resin; a curing agent; and a reinforcing fiber.

Furthermore, the present invention relates to a molded article formed by curing the fiber-reinforced composite material.

Advantageous Effects of Invention

According to the present invention, it is possible to provide an epoxy resin which has a low viscosity and excellent impregnation capability into reinforcing fibers and which provides a cured product having a high elastic modulus and excellent heat resistance when the epoxy resin is used for a fiber-reinforced resin material, and a method for producing the epoxy resin, a curable resin composition, and a cured product thereof, a fiber-reinforced composite material, and a molded article.

BRIEF DESCRIPTION OF DRAWINGS

FIG. 1 is a GPC chart of the epoxy resin (1) obtained in Example 1.

FIG. 2 is an HPLC chart of the epoxy resin (1) obtained in Example 1.

FIG. 3 is a GPC chart of the epoxy resin (2) obtained in Example 2.

FIG. 4 is an HPLC chart of the epoxy resin (2) obtained in Example 2.

FIG. 5 is a GPC chart of the epoxy resin (1') obtained in Comparative Production Example 1.

FIG. 6 is an HPLC chart of the epoxy resin (1') obtained in Comparative Production Example 1.

DESCRIPTION OF EMBODIMENTS

Hereinafter, the present invention will be described in detail.

The epoxy resin of the present invention is polyglycidyl ether that is a polycondensation product of phenol and hydroxybenzaldehyde, the resin includes a trinuclear body (X) represented by the following Structural Formula (1):

[Chem. 4]

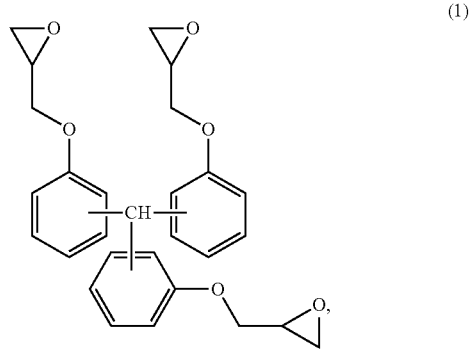

(1)

with the content of a [o,p,p] bonding body (x1) represented by the following Structural Formula (1-1) among the trinuclear body (X) being in the range of 5% to 18% in terms of an area ratio as measured by liquid chromatography.

[Chem. 5]

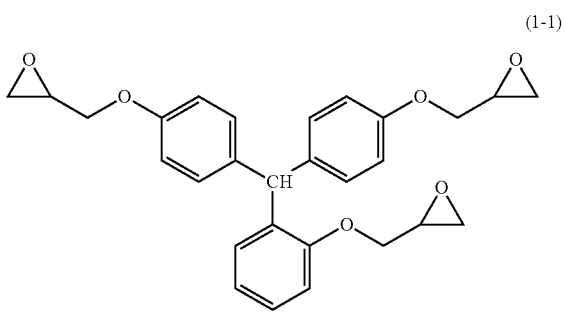

(1-1)

As the trinuclear body (X) obtained by performing polyglycidyl etherification of the polycondensation product of phenol and hydroxybenzaldehyde, a [o,o,p] bonding body (x2), a [o,o,o] bonding body (x3), and a [p,p,p] bonding body (x4), represented by the following Structural Formulas (1-2) to (1-4), can be exemplified, in addition to the [o,p,p] bonding body (x1) represented by the above Structural Formula (1-1).

[Chem. 6]

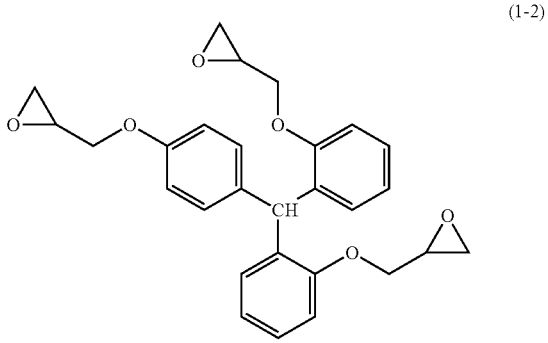

(1-2)

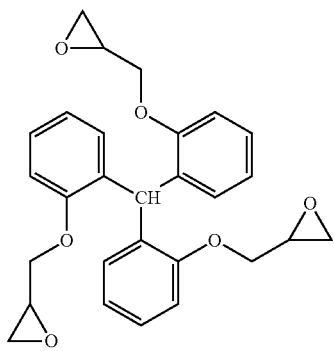

(1-3)

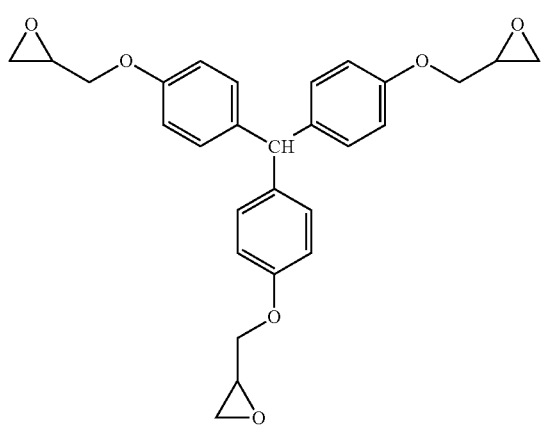

(1-4)

Among these, a distance between the bonding points of the [o,p,p] bonding body (x1) represented by Structural Formula (1-1) and the [p,p,p] bonding body (x4) represented by Structural Formula (1-4), in other words, a distance between epoxy groups in compounds is relatively long, and accordingly the epoxy resin including these bonding bodies in a large amount tends to cause a low elastic modulus in a cured product and a high viscosity. Meanwhile, in a case where these compounds are not included at all, a glass transition temperature of the cured product is decreased and heat resistance is deteriorated. In the present invention, a cured product which has a low viscosity and being excellent in both heat resistance and elastic modulus can be obtained by adjusting the content of the [o,p,p] bonding body (x1) represented by Structural Formula (1-1) in the trinuclear body (X) to 5% to 18% in terms of an area ratio as measured by liquid chromatography.

The content ratio of each component in the trinuclear body (X) as measured by liquid chromatography is a value calculated from the area ratio in a chart of liquid chromatography (HPLC) measured according to the following condition.

"Agilent 1220 Infinity LC" manufactured by TOSOH CORPORATION

Column: "TSK-GEL ODS-120T" manufactured by TOSOH CORPORATION

Detector: VWD

Data processing: "Agilent EZChrom Elite" manufactured by TOSOH CORPORATION

Measurement condition: Column temperature 40° C.
Developing solvent A liquid: water/acetonitrile=50/50 wt %
B liquid: acetonitrile
Developing condition A liquid/B liquid=95/5 (15 min)
Linear gradient (20 min)
A liquid/B liquid=0/100 (20 min)
Flow rate 1.0 ml/min
Measurement wavelength 254 nm Of the trinuclear body (X), the [o,o,p] bonding body (x2) represented by Structural Formula (1-2) is a compound having an excellent balance of a distance between bonding points and a density, and accordingly, the epoxy resin of the present invention preferably includes the [o,o,p] bonding body (x2). In particular, the content of the [o,o,p] bonding body (x2) in the trinuclear body (X) is preferably in the range of 53% to 60% in terms of an area ratio as measured by liquid chromatography, from a viewpoint of obtaining an excellent balance of heat resistance and an elastic modulus of a cured product.

The epoxy resin of the present invention is polyglycidyl ether that is a polycondensation product of phenol and hydroxybenzaldehyde. Among these, ortho-hydroxybenzaldehyde is preferably used as hydroxybenzaldehyde, from a viewpoint of easily adjusting the content of the [o,p,p] bonding body (x1) to the preferable range.

In this case, the trinuclear body (X) is a mixture of the [o,p,p] bonding body (x1), the [o,o,p] bonding body (x2), and the [o,o,o] bonding body (x3). At this time, with regard to the content of each component in the trinuclear body (X), from a viewpoint of obtaining a cured product having excellent heat resistance and a high elastic modulus, the content of the [o,p,p] bonding body (x1) is preferably in the range of 5% to 18%, the content of the [o,o,p] bonding body (x2) is preferably in the range of 53% to 60%, and the content of [o,o,o] bonding body (x3) is preferably in the range of 28% to 40%, taking the total content of these three components as 100%.

In addition, since the epoxy resin of the present invention includes the trinuclear body (X) as an essential component, the epoxy resin has a low viscosity and an excellent impregnation capability into reinforcing fibers. Among these, the content of the trinuclear body (X) in the epoxy resin is preferably 70% or more in terms of an area ratio as measured by GPC, from a viewpoint of obtaining more excellent impregnation capability into reinforcing fibers.

In the present invention, the content of the trinuclear body (X) in the epoxy resin is a value calculated from the area ratio in a chart of GPC measured according to the following condition.

Measurement apparatus: "HLC-8220 GPC" manufactured by TOSOH CORPORATION,

Column: Guard Column "HXL-L" manufactured by TOSOH CORPORATION
+"TSK-GEL G2000HXL" manufactured by TOSOH CORPORATION
+"TSK-GEL G3000HXL" manufactured by TOSOH CORPORATION
+"TSK-GEL G4000HXL" manufactured by TOSOH CORPORATION Detector: RI (Differential refractometer)

Data processing: "GPC-8020 Model II Version 4.10" manufactured by TOSOH CORPORATION Measurement condition: Column temperature 40° C.
Developing solvent Tetrahydrofuran
Flow rate 1.0 ml/minute
Standard: The monodispersed polystyrene described below whose molecular weight is well-known was used according to a measurement manual of "GPC-8020 Model II Version 4.10"

(Used Polystyrene)
"A-500" manufactured by TOSOH CORPORATION
"A-1000" manufactured by TOSOH CORPORATION
"A-2500" manufactured by TOSOH CORPORATION "A-5000" manufactured by TOSOH CORPORATION
"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION
"F-80" manufactured by TOSOH CORPORATION
"F-128" manufactured by TOSOH CORPORATION Sample: Obtained by filtrating 1.0% by mass of tetrahydrofuran solution converted in terms of a resin solid content by a micro filter (50 μl)

The epoxy equivalent of the epoxy resin of the present invention is preferably in the range of 160 to 170 g/equivalent, from a viewpoint of obtaining both excellent heat resistance of the cured product and impregnation capability into reinforcing fibers.

The epoxy resin of the present invention is obtained by performing polyglycidyl etherification of a polycondensation product of phenol and hydroxybenzaldehyde using epichlorohydrin and the like, and a method for producing thereof is not particularly limited thereto.

The reaction of phenol and hydroxybenzaldehyde can be performed, for example, in the presence of an acid catalyst of phenolhydroxybenzaldehyde under the temperature condition of 100° C. to 130° C.

The reaction ratio of phenol and hydroxybenzaldehyde is normally 1 mole or less of hydroxybenzaldehyde with respect to 1 mole of phenol. In the present invention, the molar ratio between the both (phenol:hydroxybenzaldehyde) is preferably in the range of 1:0.05 to 1:0.25. Due to this, the content of the trinuclear body (X) in the epoxy resin or the content of each component in the trinuclear body (X) can be easily adjusted to the preferable value.

Examples of the acid catalyst used for the reaction of phenol and hydroxybenzaldehyde include an inorganic acid such as hydrochloric acid, sulfuric acid, and phosphoric acid; an organic acid such as methanesulfonic acid, p-toluenesulfonic acid, and oxalic acid, Lewis acid such as boron trifluoride, anhydrous aluminum chloride, and zinc chloride. Each of these may be used alone or two or more thereof may be used in combination. Among these, p-toluenesulfonic acid is preferable because of having a high reaction promoting ability. In addition, the use amount of the acid catalyst is preferably in the range of 0.01 to 5 parts by mass with respect to 100 parts by mass of the total amount of phenol and hydroxybenzaldehyde, from a viewpoint of causing the reaction to proceed effectively.

The reaction of phenol and hydroxybenzaldehyde may be performed in an organic solvent if necessary. The organic solvent to be used herein is not particularly limited as long as the organic solvent can be used under the aforementioned temperature condition, and specific examples thereof include methyl cellosolve, ethyl cellosolve, toluene, xylene, and methyl isobutyl ketone. In a case where this organic solvent is used, the organic solvent is preferably used in the range of 10 to 500 parts by mass with respect to 100 parts by mass of the total amount of phenol and hydroxybenzaldehyde.

After the reaction is completed, a reaction mixture is neutralized in a basic substance such as sodium hydroxide, potassium hydroxide, sodium carbonate, ammonia, triethylenetetramine, and aniline, and excessive phenol is removed by an operation such as steam distillation or the like to obtain a phenolic resin intermediate.

As a specific example of the polyglycidyl etherification step of the phenolic resin intermediate, a method is exemplified, in which 2 to 10 moles of epihalohydrin is added to 1 mole of a hydroxyl group in the phenolic resin intermediate, and further epihalohydrin and the hydroxyl group in the phenolic resin intermediate are reacted with each other for 0.5 to 10 hours at a temperature of 20° C. to 120° C., while 0.9 to 2.0 moles of a basic catalyst is collectively added or gradually added to the 1 mole of the hydroxyl group in the phenolic resin intermediate.

Examples of the epihalohydrin used herein include epichlorohydrin, epibromohydrin, and β-methyl epichlorohydrin. Each of these may be used alone or two or more thereof may be used in combination. Among these, epichlorohydrin is preferable from a viewpoint of easy industrial availability. In addition, at the time of industrial production, the epihalohydrins used for preparation are all new at an initial batch of the epoxy resin production, but, after the subsequent batches, it is preferable to use epihalohydrin collected from a crude reaction product generated during the production step and new epihalohydrin in the amount corresponding to the amount lost and consumed during the reaction in combination.

In addition, specific examples of the basic catalyst include alkali earth metal hydroxides, alkali earth metal carbonates, and alkali metal hydroxides. The alkali metal hydroxides are particularly preferable from a viewpoint of obtaining excellent catalytic activity of an epoxy resin synthesis reaction and examples thereof include sodium hydroxide and potassium hydroxide. At the time of usage, this basic catalyst may be used in the form of an aqueous solution in the amount of about 10 to 55% by mass or may be used in the form of a solid. In a case where the basic catalyst is used in the form of an aqueous solution, a method may be used, in which the basic catalyst is continuously added in a reaction system, water and epihalohydrin are continuously distilled from a reaction mixture under reduced pressure or normal pressure as two liquids to remove water, and epihalohydrin continuously returns to the reaction mixture.

In addition, a reaction velocity of the phenolic resin intermediate and epihalohydrin is increased by causing the phenolic resin intermediate and epihalohydrin to react in an organic solvent and the target epoxy resin can be effectively produced. The organic solvent used herein is not particularly limited and examples thereof include ketones such as acetone and methyl ethyl ketone; alcohol compounds such as methanol, ethanol, 1-propyl alcohol, isopropyl alcohol, 1-butanol, secondary butanol, and tertiary butanol; cellosolves such as methyl cellosolve and ethyl cellosolve; ether compounds such as tetrahydrofuran, 1,4-dioxane, 1,3-dioxane, and diethoxyethane; aprotic polar solvents such as acetonitrile, dimethyl sulfoxide, and dimethylformamide. Each of these organic solvents may be used alone or two or more thereof may be used in combination in order to adjust polarity.

After the reaction is completed, the reaction product is washed with water and then the unreacted epihalohydrin or the organic solvent used in combination are distilled under a heated and reduced pressure condition. Furthermore, in order to further reduce hydrolytic halogen in the obtained epoxy resin, the epoxy resin is dissolved again in an organic solvent such as toluene, methyl isobutyl ketone, and methyl ethyl ketone, and the alkali metal hydroxides such as sodium hydroxide and potassium hydroxide are added thereto so as to be able to further perform the reaction. At this time, a phase transfer catalyst such as quaternary ammonium salt or crown ether may be present for the purpose of enhancing the reaction velocity. The use amount in a case of using the phase transfer catalyst is preferably 0.1 to 3.0 parts by mass with respect to 100 parts by mass of the used epoxy resin. After the reaction is completed, the generated salt is removed by filtration or water washing and distilling the organic solvent under a heated and reduced pressure condition, so as to be able to obtain the target epoxy resin.

The epoxy resin of the present invention preferably has a melt viscosity at 150° C. in the range of 1 to 100 mPa·s and more preferably in the range of 1 to 90 mPa·s, from a viewpoint of obtaining an excellent impregnation capability into reinforcing fibers.

The curable resin composition of the present invention includes the epoxy resin of the present invention and a curing agent.

Examples of the curing agent used herein include an amine compound, an amide compound, an acid anhydride, and a phenol resin. Each of these may be used alone or two or more thereof may be used in combination. Examples of the amine compound include a dicyandiamide compound, an aromatic amine compound, diethylenetriamine, triethylenetetramine, isophoronediamine, imidazole, a $BF_3$-amine complex, and a guanidine derivative. Examples of the amide-based compound include dicyandiamide and a polyamide resin synthesized by a dimer of linolenic acid and ethylenediamine. Examples of the acid anhydride include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride and methylhexahydrophthalic anhydride. Examples of the phenol resin include a phenol novolac resin, a cresol novolac resin, an aromatic hydrocarbon formaldehyde resin-modified phenol resin, a dicyclopentadiene phenol added-type resin, a phenol aralkyl resin (XYLOC resin), a polyhydric phenol novolac resin synthesized from a polyhydric hydroxy compound and formaldehyde represented by a resorcin novolac resin, a naphthol aralkyl resin, a trimethylolmethane resin, a tetraphenylolethane resin, a naphthol novolac resin, a naphtholphenol co-condensed novolac resin, a naphthol-cresol co-condensed novolac resin, a biphenyl-modified phenol resin (a polyhydric phenol compound in which a phenol nucleus is linked by a bismethylene group), a biphenyl-modified naphthol resin (a polyhydric naphthol compound in which a phenol nucleus is linked by a bismethylene group), a polyhydric phenol compound such as an aminotriazine-modified phenol resin (a polyhydric phenol compound in which a phenol nucleus is linked by melamine, benzoguanamine, or the like) and an alkoxy group-containing aromatic ring-modified novolac resin (a polyhydric phenol compound in which a phenol nucleus and an alkoxy group-containing aromatic ring are linked by formaldehyde).

In addition, among the above, in a case where a curable resin composition having a low viscosity and excellent storage stability is desired, an acid anhydride is preferably used and an alicyclic acid anhydride such as tetrahydrophthalic anhydride, methyltetrahydrophthalic anhydride, methylnadic anhydride, hexahydrophthalic anhydride and methylhexahydrophthalic anhydride is more preferably used.

In this case, in a blending ratio of the curing agent to the epoxy resin component, an active group in the curing agent is 0.5 to 1.5 equivalents with respect to 1 equivalent of the total amount of the epoxy group in the epoxy resin component, from a viewpoint of obtaining a cured product having excellent curing properties, a high elastic modulus and excellent heat resistance.

In addition, among the above, in a case where a curable resin composition is desired which has a low viscosity, and a high elastic modulus and excellent heat resistance when produced as a cured product, and in which high performances can be maintained without degrading these properties even when exposed to a wet and hot condition, a dicyandiamide compound is preferably used. The dicyandiamide compound used as the curing agent of the epoxy resin is dicyandiamide or a compound obtained by modifying a functional group in dicyandiamide, that is, an amino group, an imino group, or a cyano group. Examples thereof include o-tolyl biguanide and diphenyl biguanide. Each of these may be used alone or two or more thereof may be used in combination.

In this case, in a blending ratio of the dicyandiamide compound to the epoxy resin component, a molar number of active hydrogen in the dicyandiamide compound is 0.5 to 1.0 equivalents with respect to 1 equivalent of the total amount of the epoxy group in the epoxy resin component, from a viewpoint of obtaining a cured product having excellent curing properties, a high elastic modulus, and excellent heat resistance.

In addition, among the above, in a case where a curable resin composition is desired, which has an excellent impregnation capability into reinforcing fibers, and a high elastic modulus and excellent heat resistance when produced as a cured product, and in which degradation of these properties can be suppressed even when exposed in a wet and hot condition, an aromatic amine compound is preferably used. The aromatic amine compound used as the curing agent of the epoxy resin is not particularly limited as long as the aromatic amine compound is aromatic amines, but a compound having a plurality of aromatic rings with an amino group directly bonded thereto is preferable. As a specific example, 3,3'-diaminodiphenyl sulfone (3,3'-DDS), 4,4'-diaminodiphenyl sulfone (4,4'-DDS), diaminodiphenyl methane (DDM), 3,3'-diisopropyl-4,4'-diaminodiphenyl methane, 3,3'-di-t-butyl-4,4'-diaminodiphenyl methane, 3,3'-diethyl-5,5'-dimethyl-4,4'-diaminodiphenyl methane, 3,3'-diisopropyl-5,5'-dimethyl-4,4'-diaminodiphenyl methane, 3,3'-di-t-butyl-5,5'-dimethyl-4,4'-diaminodiphenyl methane, 3,3',5,5'-tetraethyl-4,4'-diaminodiphenyl methane, 3,3'-diisopropyl-5,5'-diethyl-4,4'-diaminodiphenyl methane, 3,3'-di-t-butyl-5,5'-diethyl-4,4'-diaminodiphenyl methane, 3,3',5,5'-tetraisopropyl-4,4'-diaminodiphenyl methane, 3,3'-di-t-butyl-5,5'-diisopropyl-4,4'-diaminodiphenyl methane, 3,3',5,5'-tetra-t-butyl-4,4'-diaminodiphenyl methane, diaminodiphenyl ether (DADPE), bisaniline, or benzyl dimethyl aniline can be used. Each of these may be used alone or two or more thereof may be mixed to be used.

In this case, in the curable resin composition of the present invention, in a blending ratio of the aromatic amine compound to the epoxy resin component, a molar number of active hydrogen in the aromatic amine compound is preferably 0.7 to 1.3 equivalents with respect to 1 equivalent of the total amount of the epoxy group in the epoxy resin included in the curable resin component, from a viewpoint of obtaining a cured product having excellent curing properties, excellent heat resistance, and a high elastic modulus.

In addition, in the curable resin composition of the present invention, other epoxy resins may be used other than the epoxy resin of the present invention as the epoxy resin component. Specifically, other epoxy resins can be used in combination within a range that the epoxy resin of the present invention is 30% by mass or more and preferably 40% by mass or more with respect to the total mass of the epoxy resin component.

Various epoxy resins can be used as the other epoxy resins, and examples thereof include a bisphenol type epoxy resin such as a bisphenol A type epoxy resin and a bisphenol F type epoxy resin; a biphenyl type epoxy resin such as a biphenyl type epoxy resin and a tetramethylbiphenyl type epoxy resin; an novolac type epoxy resin such as a phenol novolac type epoxy resin, a cresol novolac type epoxy resin, a naphthol novolac type epoxy resin, a naphthol-phenol co-condensed novolac type epoxy resin, a bisphenol A novolac type epoxy resin, and a biphenyl novolac type epoxy resin; an aralkyl type epoxy resin such as a phenol aralkyl type epoxy resin and a naphthol aralkyl type epoxy resin; a tetraphenylethane type epoxy resin, a dicyclopentadiene-phenol addition reaction type epoxy resin, and an aromatic hydrocarbon formaldehyde resin-modified phenol resin type epoxy resin. Each of these may be used alone or two or more thereof may be used in combination. Among these, a bisphenol type epoxy resin is preferable from a viewpoint of obtaining a cured product having a high elastic modulus.

In addition, the curable resin composition of the present invention may contain various additives such as a curing accelerator, a flame retardant, or the like, as necessary.

Examples of the curing accelerator include a phosphorus-based compound, a tertiary amine, imidazole, an organic acid metal salt, Lewis acid, and an amine complex salt. In particular, in a case where the dicyandiamide compound or aromatic amine is used as the curing agent, examples of the curing accelerator include an imidazole compound such as 1-methyl imidazole, 2-methyl imidazole, 1,2-dimethyl imidazole, 2-ethyl-4-methyl imidazole, 2-ethyl-2-phenyl imidazole, and 1-cyanoethyl-2-ethyl-4-methyl imidazole; a tertiary amine compound such as triethylamine and 2,4,6-tris (dimethyl aminomethyl)phenol; a Lewis acid complex of boron halaide such as a boron trifluoride.piperidine complex, a boron trifluoride•monoethylamine complex, a boron trifluoride•triethanolamine complex, and a boron trichloride•octylamine complex; a dicyandiamide derivative; an onium salt such as an ammonium salt and a phosphonium salt; and an urea derivative such as N,N-dimethyl-N'-(3-chloro-4-methyl phenyl)urea, N,N-dimethyl-N'-(4-chlorophenyl)urea, N,N-dimethyl-N'-(3,4-dichlorophenyl)urea, N,N-dimethyl-N'-(3,4-dichloromethyl phenyl)urea, 2,4-(N',N'-dimethyl ureido)toluene, and 1,4-bis (N',N'-dimethyl ureido)benzene. Each of these may be used alone or two or more thereof may be used in combination. Also, the addition amount thereof is preferably in the range of 0.01 parts by mass to 5 parts by mass in the 100 parts by mass of the curable resin composition.

Examples of the flame retardant include an inorganic phosphorus compound such as red phosphorus, ammonium phosphate including monoammonium phosphate, diammonium phosphate, triammonium phosphate, and ammonium polyphosphate, and amide phosphate; an organic phosphorus compound such as a phosphate compound, a phosphonic acid compound, a phosphinic acid compound, a phosphine oxide compound, a phosphorane compound, an organic nitrogen-containing phosphorous compound, and a derivative obtained by reacting a cyclic organic phosphorus compound including 9,10-dihydro-9-oxa-10-phosphaphenanthrene-10-oxide, 10-(2,5-dihydrooxyphenyl)-10H-9-oxa-10-phosphaphenanthrene-10-oxide, and 10-(2,7-dihydrooxynaphthyl)-10H-9-oxa-10-phosphaphenanthrene-10-oxide with a compound such as an epoxy resin or a phenol resin; a nitrogen-based flame retardant such as a triazine compound, a cyanuric acid compound, an isocyanuric acid compound, and phenothiazine; a silicone-based flame retardant such as silicone oil, a silicone rubber, and a silicone resin; and an inorganic flame retardant such as metal hydroxides, metal oxides, metal carbonate compounds, metal powder, boron compounds and a low melting point glass. In a case where this flame retardant is used, the flame retardant is preferably used in the range of 0.1 to 20% by mass in the curable resin composition.

In addition, the curable resin composition of the present invention may contain a thermoplastic resin if necessary. The thermoplastic resin is not particularly limited, but a thermoplastic resin which is soluble in the epoxy resin and has a functional group having hydrogen bonding properties. If the curable resin composition of the present invention contains the aforementioned thermoplastic resin, the epoxy resin and the thermoplastic resin are combined with each other to enhance adhesion of the curable resin composition to the reinforcing fibers.

Examples of the thermoplastic resin having a functional group having hydrogen bonding properties include a thermoplastic resin having a functional group such as a hydroxyl group, an amide bond, and a sulfonyl group. Examples of the thermoplastic resin having a hydroxyl group include a polyvinyl acetal resin such as polyvinyl formal and polyvinyl butyral, polyvinyl alcohol, and a phenoxy resin. Examples of the thermoplastic resin having an amide bond include polyamide, polyimide, and polyvinyl pyrrolidone. Examples of the thermoplastic resin having a sulfonyl group include polysulfone. Among the thermoplastic resins exemplified above, polyamide, polyimide, and polysulfone may have a functional group such as an ether bond and a carbonyl group on a main chain. Further, among the above, polyamide may have a substituent on a nitrogen atom of the amide group.

The thermoplastic resin described above can be produced according to a well-known method, but it is convenient to use a commercially available product. Among the thermoplastic resins, as the commercially available thermoplastic resin, Denkabutyral and "Denkaformal (registered trademark)" (manufactured by Denki Kagaku Kogyo Co., Ltd.) and "Vinylec (registered trademark)" (manufactured by Chisso. Corp) can be exemplified as a polyvinyl acetal resin, "UCAR (registered trademark)" and PKHP (manufactured by Union Carbide Corporation) can be exemplified as a phenoxy resin, "Macromelt (registered trademark)" (manufactured by Henkel Hakusui Corporation) and "Amilan (registered trademark)" CM4000 (manufactured by TORAY INDUSTRIES, INC.) can be exemplified as a polyamide resin, "Ultem (registered trademark)" (manufactured by General Electric Company) and "Matrimid (registered trademark)" 5218 (manufactured by Ciba. Co) can be exemplified as polyimide, "Victrex (registered trademark)" (manufactured by Mitsui Chemicals, Inc.) and "UDEL (registered trademark)" (manufactured by Union Carbide Corporation) can be exemplified as polysulfone, and "Luviskol (registered trademark)" (manufactured by BASF Japan Ltd.) can be exemplified as polyvinylpyrrolidone.

Further, the curable resin composition of the present invention can contain a thermoplastic resin other than the resin described above. Examples of such a thermoplastic resin include an acrylic resin. The acrylic resin is soluble in the epoxy resin and has high compatibility with the epoxy resin. Therefore, the acrylic resin is appropriate for suppressing a viscoelasticity of the curable resin composition. Examples of the commercially available product of the acrylic resin include "Dianal (registered trademark)" BR series (manufactured by Mitsubishi Rayon co., Ltd.) and "Matsumoto microsphere (registered trademark)" M, M100, and M500 (manufactured by Matsumoto Yushi-Seiyaku Co., Ltd.).

The curable resin composition of the present invention may contain other additives if necessary. Examples of the other additives include organic and inorganic particles. Examples of the organic and inorganic particles include rubber particles and thermoplastic resin particles. The rubber particles are not particularly limited, but crosslinked rubber particles and core shell rubber particles in which various polymers are graft polymerized on the surface of the crosslinked rubber particles are preferable from a viewpoint of handleability.

Examples of the crosslinked rubber particles include FX501P composed of a crosslinked product of a carboxyl-modified butadiene-acrylonitrile copolymer (manufactured by JSR Corporation), CX-MN series composed of acrylic rubber fine particles (manufactured by Nippon Shokubai Co., Ltd.), and YR-500 series (manufactured by NIPPON STEEL & SUMIKIN CHEMICAL CO., LTD.).

Examples of the core shell rubber particles include "Paraloid (registered trademark)" EXL-2655 composed of a copolymer of butadiene•alkyl methacrylate•styrene (manufactured by KUREHA CORPORATION), "Stafyroid (registered trademark)" AC-3355 and TR-2122 composed of a copolymer of acrylic ester•methacrylic ester (manufactured by Takeda Pharmaceutical Company), "PARALOID (registered trademark)" EXL-2611 and EXL-3387 composed of a copolymer of butyl acrylate•methyl methacrylate (manufactured by Rohm&Haas Co.), and "Kaneace (registered trademark)" MX series (manufactured by Kaneka Corporation).

As the thermoplastic resin particles, for example, polyamide particles or polyimide particles are preferable. Examples of the polyamide particles include SP-500 (manufactured by TORAY INDUSTRIES, INC.), "Orgasol (registered trademark)" (manufactured by ARKEMA K.K.).

A blending amount of the organic particles such as thermoplastic resin particles and the rubber particles is preferably 0.1 parts by mass to 30 parts by mass and more preferably 1 part by mass to 15 parts by mass, when the total mass of the curable resin composition is taken as 100 parts by mass, from a viewpoint of obtaining both an elastic modulus and toughness of the obtained cured product.

The curable resin composition of the present invention can be used for various purposes by utilizing the features such as excellent fluidity and a high elastic modulus and excellent heat resistance when produced as a cured product. Specific examples thereof include a fiber reinforced resin molded article such as CFRP represented by housings or various members of an automobile or airplane, a resin material used for an electronic circuit board such as a laminated plate for a printed circuit board, an interlayer insulating material for a build-up substrate, an adhesive film for build-up, a semiconductor sealing material, a die attach adhesive, an under filling material for mounting a flip chip, a glob top material, a liquefied sealing material for TCP, a conductive adhesive, a liquid crystal sealing material, a cover lay for a flexible substrate, and a resist ink; a coating material such as an optical material including an optical waveguide and an optical film, a resin casting material, an adhesive, and an insulating coating material; and various optical semiconductor device such as an LED, a phototransistor, a photodiode, a photocoupler, a CCD, an EPROM, and a photosensor. In particular, the curable resin composition of the present invention can be appropriately used for a fiber reinforced resin molded article such as CFRP represented by housings or various members of an automobile or airplane.

In a case where the curable resin composition of the present invention is normally used by being diluted in an organic solvent, for example, a laminated plate or a film, the organic solvent may be appropriately blended according to the necessity. Examples of the organic solvent used herein include acetone, methyl ethyl ketone, and ethyl acetate, and among these, an organic solvent having a boiling point of 100° C. or less is preferably used. The use amount of the organic solvent depends on the purpose, but the organic solvent amount in the curable resin composition is preferably 60% by mass or less.

In a case where the curable resin composition of the present invention is used for a fiber-reinforced composite material, substantially, it is preferable not to use an organic solvent, and in a case where the organic solvent is used, the organic solvent amount in the fiber-reinforced composite material is preferably 5% by mass or less. Examples of the organic solvent used herein include acetone, methyl ethyl ketone, and ethyl acetate, and among these, an organic solvent having a boiling point of 100° C. or less is preferably used.

The reinforcing fibers used for the fiber-reinforced composite material of the present invention may be any one of twisted yarn, an untwisted yarn, and a zero twist yarn. The untwisted yarn or zero twist yarn is preferable from a viewpoint of obtaining both moldability and mechanical strength of members made of fiber reinforced plastics. Further, as the form of the reinforcing fibers, fibers which are paralleled in one direction or woven fibers can be used, the fibers can be selected freely according to the part to be used or the purpose as the woven fibers, for example, a plain weave or a satin weave. Specific examples of the material include a carbon fiber, a glass fiber, an aramid fiber, a boron fiber, an alumina fiber, and a silicon carbide fiber, from a viewpoint of obtaining excellent mechanical strength or durability. Each of these may be used alone or two or more thereof may be used in combination. Among these, in particular, the carbon fiber is preferable from a viewpoint of obtaining satisfactory strength of a molded article, and as the carbon fibers, various fibers such as polyacrylonitrile-based, a pitch-based, or a rayon-based fiber can be used. Among these, a poylacrylonitrile-based fiber is preferable, from a viewpoint of obtaining the carbon fibers having high strength easily.

As a method for obtaining the fiber-reinforced composite material from the curable resin composition of the present invention, a wet method, in which a varnish obtained by uniformly mixing each component configuring the curable resin composition using the organic solvent is prepared, next this varnish is impregnated into a fiber sheet composed of the reinforcing fibers, and then the organic solvent is evaporated using an oven or the like to obtain the fiber-reinforced composite material, or a hot melt method, in which a sheet obtained by laminating the curable resin composition with a decreased viscosity by means of heating without using the organic solvent on a roll paper or a release paper, and next a surface of the sheet with the curable resin composition laminated thereon is overlapped on both sides or one side of the fiber sheet composed of the reinforcing fibers to heat and pressurized so as to perform impregnation, can be appropriately used. However, the hot melt method in which the organic solvent remaining in the fiber-reinforced composite material is none is preferably used.

In a case where the fiber-reinforced composite material is produced according to the hot melt method, in order to set handleability of the fiber-reinforced composite material to an appropriate range, in the impregnation step, the temperature at which the curable resin composition reaches is preferably in the range of 50° C. to 250° C. and in particular, it is preferable to cure the curable resin composition preliminarily at a temperature of 50° C. to 100° C. If the temperature at which the curable resin composition reaches is 100° C. or lower, a curing reaction proceeds partially in the curable resin composition so as to be able to suppress an increase in the glass transition temperature, and accordingly, the obtained fiber-reinforced composite material can maintain appropriate drape properties. If the temperature at which the curable resin composition reaches is 50° C. or higher, impregnation into the reinforcing fibers is performed sufficiently.

In addition, in the fiber-reinforced composite material of the present invention, the curable resin composition does not necessarily need to be impregnated into the inside of a fiber bundle, and the curable resin composition may be localized in the periphery of the surface of the fiber sheet.

Further, in the fiber-reinforced composite material of the present invention, the volume content of the reinforcing fibers is preferably 40% to 85% with respect to the total volume of the fiber-reinforced composite material, and particularly preferably in the range of 50% to 70% from a viewpoint of the strength. If the volume content is 40% or more, a cured product obtained from the fiber-reinforced composite material has excellent flame retardancy. In addition, if the volume content is 85% or less, adhesion of the curable resin composition to the reinforcing fibers is excellent, and when a plurality of the fiber-reinforced composite materials are laminated, adhesion between the fiber-reinforced composite materials are satisfactory.

As a method for producing a fiber reinforced resin molded article using the fiber-reinforced composite material of the present invention, a hand layup method in which a fiber aggregate is laid on a die to laminate the varnish in a multiple manner, a spray up method, a vacuum bag method in which the curable resin composition is laminated in an overlapping manner on a base material composed of the reinforcing fibers while the composition is impregnated to mold, using any one of a male die and a female die, a flexible die which causes a molded product to be pressurized is covered thereon, and an air-tightly sealed material is molded in vacuum (reduced pressure), a SMC press method in which the fiber-reinforced composite material containing the reinforcing fibers is made to be in a sheet shape in advance to compression mold the material in a die, an RTM method in which the curable resin composition is injected into a combination die where fibers are paved, and a method in which the curable resin composition is impregnated into the reinforcing fibers to produce a prepreg so as to burn and solidify the composition in a large autoclave, can be exemplified. As the fiber reinforced molded article produced according to the aforementioned methods, specifically, the volume content of the reinforcing fibers in the fiber reinforced molded article is preferably in the range of 40% to 85%, and particularly preferably in the range of 50% to 70% from a viewpoint of the strength.

Examples of the use of the fiber reinforced molded article obtained in the above manner include sports equipment such as a fishing rod, a golf shaft, and an automobile frame, a frame or a body material of an automobile or an airplane, space craft members, a wind power generator blade, parts of an automobile such as a front subframe, a rear subframe, a front pillar, a center pillar, a side member, a cross member, a side sill, a roof rail, and a propeller shaft, core member of a wire and cable, a pipe material for an offshore oilfield, a roll pipe material for a printer, and a robot fork material, but, in particular, since the member of an automobile, member of an airplane, and member of an aircraft are required to have high fracture toughness and mechanical strength, the fiber reinforced resin molded article of the present invention is preferably applied for these purposes.

The curable resin composition of the present invention can be used for the purpose other than the aforementioned purposes as a cured product. A method for obtaining a cured product from the curable resin composition of the present invention may be based on a general curing method of the curable resin composition, and for example, the heating temperature condition may be appropriately selected depending on the type of the curing agent to be combined or the purpose. For example, a method of heating the curable resin composition in the temperature range from about room temperature to 250° C. can be exemplified. As a molding method, a general method for molding the curable resin composition can be used, and in particular, specific conditions for the curable resin composition of the present invention are not necessary.

EXAMPLES

Next, the present invention will be described using Examples and Comparative Examples, but the "parts" and "%" described below are based on a mass unless otherwise indicated.

The content of each component in the trinuclear body (X) in Example of the present application was calculated from an area ratio of the liquid chromatography (HPLC) chart measured under the condition described below.

"Agilent 1220 Infinity LC" manufactured by TOSOH CORPORATION,

Column: "TSK-GEL ODS-120T" manufactured by TOSOH CORPORATION

Detector: VWD

Data processing: "Agilent EZChrom Elite" manufactured by TOSOH CORPORATION

Measurement condition: Column temperature 40° C.

Developing solvent A liquid: water/acetonitrile=50/50 wt %

B liquid: acetonitrile

Developing condition A liquid/B liquid=95/5 (15 min)

Linear gradient (20 min)

A liquid/B liquid=0/100 (20 min)

Flow rate 1.0 ml/min

Measurement wavelength 254 nm

Standard: The monodispersed polystyrene described below whose molecular weight is well-known was used according to a measurement manual of "GPC-8020 Model II Version 4.10".

(Used Polystyrene)

"A-500" manufactured by TOSOH CORPORATION

"A-1000" manufactured by TOSOH CORPORATION

"A-2500" manufactured by TOSOH CORPORATION

"A-5000" manufactured by TOSOH CORPORATION

"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION
"F-80" manufactured by TOSOH CORPORATION
"F-128" manufactured by TOSOH CORPORATION Sample: Obtained by filtrating 1.0% by mass of tetrahydrofuran solution converted in terms of a resin solid content by a micro filter (50 μl)

The melt viscosity of the epoxy resin was measured by an ICI viscometer based on ASTM D4287.

The softening point of the epoxy resin was measured based on IS K7234.

Example 1

Production of Epoxy Resin (1)

1128 g of phenol (12.0 mol), 122 g of salicylaldehyde (1.0 mol), and 12.5 g of p-toluenesulfonic acid were put into a flask in which a nitrogen introduction tube, a cooling tube, a thermometer, a dean-stark apparatus and a stirrer are set, and the temperature was increased up to 120° C. over 45 minutes with stirring. The contents were reacted at a temperature of 120° C. for 3 hours while the condensed water generated by the reaction was removed by distillation by means of a dean-stark apparatus. After the reaction was completed, 5.1 g of 49% sodium hydroxide aqueous solution was added thereto to neutralize the resultant and switch to a dewatering circuit, and the temperature was increased up to 180° C. over 3 hours. Excessive phenol was partially removed while vapor was dedicatedly blown into the system so as to obtain 280 g of a phenolic resin intermediate (1) having a softening point of 108° C. and a hydroxyl equivalent of 98 g/eq.

Next, 98 g of the previously obtained phenolic resin intermediate (1) (1.0 mol), 463 g of epichlorohydrin (5.0 mol), 139 g of n-butanol, and 2 g of tetraethyl benzyl ammonium chloride were put into a flask in which a nitrogen introduction tube, a cooling tube, a thermometer, and a stirrer are set, and dissolved. After the temperature was increased up to 65° C., the pressure was reduced to an azeotropic pressure, and 90 g of 49% sodium hydroxide aqueous solution (1.1 mol) was added dropwise over 5 hours. After adding the solution dropwise, a distilled fraction caused by azeotropy is separated by a dean-stark trap, an aqueous layer was removed, and the reaction was performed for 30 minutes while only an oily layer returns in the reaction system. The unreacted epichlorohydrin was distilled by distillation under reduced pressure, 59 g of methyl ethyl ketone and 177 g of n-butanol were added to the obtained crude product to be dissolved, and then 10 g of 10% sodium hydroxide aqueous solution was added thereto to increase the temperature up to 80° C., and the reaction was performed for 2 hours. The reaction product was washed with 150 g of water and washing was performed three times in the same manner until the pH of the washing liquid indicates neutral. After dewatering by means of azeotropy was performed and a precise filtration was performed, a solvent was distilled under reduced pressure to obtain a semisolid epoxy resin (1) at room temperature. FIG. 1 illustrates a GPC chart of the epoxy resin (1) and FIG. 2 illustrates an HPLC chart. The epoxy equivalent of the epoxy resin (1) was 164 g/eq and the melt viscosity at a temperature of 150° C. was 0.2 dPa·s. In addition, the content of the trinuclear body (X) in the epoxy resin (1) calculated from the GPC chart was 75.9%, the content of the [o,p,p] bonding body (x1) in the trinuclear body (X) was 13.4%, the content of the [o,o,p] bonding body (x2) was 56.1%, and the content of the [o,o,o] bonding body (x3) was 30.5%, each calculated from the HPLC chart. The results are shown in Table 1.

Example 2

Production of an Epoxy Resin (2)

940 g of phenol (10.0 mol), 122 g of salicylaldehyde (1.0 mol), 10.7 g of p-toluenesulfonic acid, and 1062 g of toluene were put into a flask in which a nitrogen introduction tube, a cooling tube, a thermometer, a dean-stark apparatus and a stirrer are set, and the temperature was increased up to 120° C. over 45 minutes while the flask was stirred. The contents were reacted at a temperature of 120° C. for 3 hours while the condensed water was removed by distillation by means of a dean-stark apparatus. After the reaction was completed, 5.1 g of 49% sodium hydroxide aqueous solution was added thereto to neutralize the resultant and switch to a dewatering circuit, and the temperature was increased up to 180° C. over 3 hours. Excessive phenol was partially removed while vapor was dedicatedly blown into the flask so as to obtain 277 g of a phenolic resin intermediate (2) having a softening point of 117° C. and a hydroxyl equivalent of 98 g/eq.

The same was performed as Production Example 1 so as to obtain a solid epoxy resin (2) at room temperature except that 98 g of the phenolic resin intermediate (1) (1.0 mol) was changed to 98 g of the phenolic resin intermediate (2) (1.0 mol). FIG. 3 illustrates a GPC chart of the epoxy resin (2) and FIG. 4 illustrates an HPLC chart. The epoxy equivalent of the epoxy resin (2) was 166 g/eq, the melt viscosity at a temperature of 150° C. was 0.6 dPa·s, and the softening point was 56° C. In addition, the content of the trinuclear body (X) in the epoxy resin (2) calculated from the GPC chart was 56.9%, the content of the [o,p,p] bonding body (x1) in the trinuclear body (X) was 5.5%, the content of the [o,o,p] bonding body (x2) was 55.1%, and the content of the [o,o,o] bonding body (x3) was 39.4%, each calculated from the HPLC chart. The results are shown in Table 1.

Comparative Production Example 1

Production of Epoxy Resin (1')

The same was performed as Example 1 so as to obtain an epoxy resin (1') except that 98 g of the phenolic resin intermediate (1) (1.0 mol) was changed to "TPM-113". FIG. 5 illustrates a GPC chart of the epoxy resin (1') and FIG. 6 illustrates an HPLC chart. The epoxy equivalent of the epoxy resin (1') was 169 g/eq, and the melt viscosity at a temperature of 150° C. was 1.0 dPa·s. In addition, the content of the trinuclear body (X) in the epoxy resin (1') calculated from the GPC chart was 65.8%, the content of the [o,p,p] bonding body (x1) in the trinuclear body (X) was 20.2%, the content of the [o,o,p] bonding body (x2) was 52.1%, and the content of the [o,o,o] bonding body (x3) was 27.7%, each calculated from the HPLC chart. The results are shown in Table 1.

TABLE 1

|  | Epoxy resin (1) | Epoxy resin (2) | Epoxy resin (1') |
|---|---|---|---|
| Content of trinuclear body (X) in the epoxy resin [%] | 75.9 | 56.9 | 65.8 |
| Content of the [o, p, p] bonding body (x1) in the trinuclear body (X) [%] | 13.4 | 5.5 | 20.2 |
| Content of the [o, o, p] bonding body (x2) in the trinuclear body (X) [%] | 56.1 | 55.1 | 52.1 |
| Content of the [o, o, o] bonding body (x3) in the trinuclear body (X) [%] | 30.5 | 39.4 | 27.7 |
| Melt viscosity at a temperature of 150° C. [dPa · s] | 0.2 | 0.6 | 1.0 |

Examples 3 to 8 and Comparative Examples 1 to 3

The curable resin composition was blended according to the manner described below and various evaluations were performed with respect to the cured product thereof. The blending amounts and the results of various evaluations are shown in Tables 2 to 4. In addition, the details of each component in Tables are as follows.

Epoxy resin (1): Epoxy resin produced in Example 1
Epoxy resin (2): Epoxy resin produced in Example 2
Epoxy resin (1'): Epoxy resin produced in Comparative Production Example 1
Acid anhydride curing agent:
Methyltetrahydrophthalic anhydride ("EPICLON B-570H" manufactured by DIC Corporation, acid anhydride group equivalent 166 g/eq)
1,2-DMZ: 1,2-dimethylimidazole
Dicyandiamide: "JERcure DICY-7" manufactured by Mitsubishi Chemical Corporation
DCMU: N,N-dimethyl-N'-(3,4-dichlorophenyl)urea ("DCMU" manufactured by HODOGAYA CHEMICAL CO., LTD.)
4,4'-diaminodiphenyl sulfone: "SEIKACURE-S" manufactured by Wakayama Seika Kogyo Co., Ltd.

<Preparation of Curable Resin Composition>

The respective components were blended according to the ratio shown in the following Tables 2 to 4, and mixed uniformly by molten kneading to thereby obtain curable resin compositions of Example 3 to Comparative Example 3.

<Evaluation of Heat Resistance>

The curable resin compositions obtained in Examples 3 to 4 and Comparative Example 1 were poured into a die frame having a width of 90 mm, a length of 110 mm, and a height of 2 mm and press molded at a temperature of 150° C. for 1 hour to obtain a cured product. The cured product was cut by a diamond cutter to have a width of 5 mm and a length of 50 mm and a dynamic viscoelasticity was measured under the following condition in a double cantilever bending mode using "DMS 6100" manufactured by SII NanoTechnology Inc. The evaluation was performed by taking the onset temperature of the storage elastic modulus (E') as a glass transition temperature (Tg). The results are shown in Table 2.

[Measurement Condition]

Measurement temperature range: Room temperature to 260° C.
Temperature rising rate: 3° C./min
Frequency: 1 Hz (sine wave)
Strain amplitude: 10 μm <Evaluation of Heat Resistance>

The curable resin compositions obtained in Examples 5 to 8 and Comparative Examples 2 and 3 were poured into a die frame having a width of 90 mm, a length of 110 mm, and a height of 2 mm and press molded at a temperature of 150° C. for 1 hour to obtain a cured product. The cured product was cut by a diamond cutter to have a width of 5 mm and a length of 50 mm and a dynamic viscoelasticity was measured under the following condition in a double cantilever bending mode using "DMS 6100" manufactured by SII NanoTechnology Inc. The evaluation was performed by taking the temperature in which tan δ is the maximum as a glass transition temperature (Tg). The results are shown in Tables 3 and 4.

[Measurement Condition]

Measurement temperature range: Room temperature to 260° C.
Temperature rising rate: 3° C./min
Frequency: 1 Hz (sine wave)
Strain amplitude: 10 μm <Measurement of Bending Strength and Bending Elastic Modulus>

The curable resin compositions obtained in Examples 3 to 6 and Comparative Examples 1 and 2 were poured into a die frame having a width of 90 mm, a length of 110 mm, and a height of 2 mm and press molded at a temperature of 150° C. for 1 hour to obtain a cured product. The bending strength and the bending elastic modulus of the cured product were measured according to JIS K6911. The results are shown in Tables 2 and 3.

<Measurement of Bending Strength and Bending Elastic Modulus>

The curable resin compositions obtained in Examples 7 and 8 and Comparative Example 3 were poured into a die frame having a width of 90 mm, a length of 110 mm, and a height of 2 mm and press molded at a temperature of 150° C. for 1 hour. Then, the compositions were further heated for 3 hours to obtain a cured product (Sample 2). The bending strength and the bending elastic modulus of the obtained sample 2 were measured according to JIS K6911. The results are shown in Table 4.

<Physical Property Retention Rate after Moisture and Heat Resistance Test>

The cured product obtained from the curable resin composition obtained in Examples 3 to 8 and Comparative Examples 2 and 3 were placed alone in an environment of a temperature of 121° C. and a humidity of 100% for 6 hours. Then, according to the method same as the previous one, the glass transition temperature, the bending strength, and the bending elastic modulus were measured. Further, the value after the test of moisture and heat to the value before the test of moisture and heat was calculated to evaluate the value as the physical property retention rate. The results are shown in Tables 3 and 4.

TABLE 2

| | Example 3 | Example 4 | Comparative Example 1 |
|---|---|---|---|
| Epoxy resin (1) | 50.3 | | |
| Epoxy resin (2) | | 50.3 | |
| Epoxy resin (1') | | | 50.3 |
| Acid anhydride curing agent | 49.7 | 49.7 | 49.7 |
| 1,2-DMZ | 1.0 | 1.0 | 1.0 |
| Heat resistance Tg [° C.] | 196 | 192 | 190 |
| Bending strength [MPa] | 138 | 117 | 115 |
| Bending elastic modulus [Mpa] | 3700 | 3800 | 3400 |

TABLE 3

| | | Example 5 | Example 6 | Comparative Example 2 |
|---|---|---|---|---|
| Epoxy resin (1) | | 92 | | |
| Epoxy resin (2) | | | 92 | |
| Epoxy resin (1') | | | | 92 |
| Dicyandiamide | | 8 | 8 | 8 |
| DCMU | | 1 | 1 | 1 |
| Evaluation before moisture and heat test | Heat resistance Tg [° C.] | 272 | 273 | 270 |
| | Bending strength [MPa] | 123 | 110 | 113 |
| | Bending elastic modulus [Mpa] | 3600 | 3500 | 3300 |
| Evaluation after moisture and heat test | Heat resistance Tg [° C.] | 258 (94.8%) | 256 (93.8%) | 249 (92.1%) |
| | Bending strength [MPa] | 118 (96.3%) | 104 (94.3%) | 102 (90.3%) |
| | Bending elastic modulus [Mpa] | 3500 (97.2%) | 3400 (97.2%) | 3000 (90.9%) |

TABLE 4

| | | Example 7 | Example 8 | Comparative Example 3 |
|---|---|---|---|---|
| Epoxy resin (1) | | 73 | | |
| Epoxy resin (2) | | | 73 | |
| Epoxy resin (1') | | | | 73 |
| 4,4'-diaminodiphenyl sulfone | | 27 | 27 | 27 |
| Evaluation before moisture and heat resistance test | Heat resistance Tg [° C.] | 356 | 360 | 350 |
| | Bending strength [MPa] | 129 | 130 | 125 |
| | Bending elastic modulus [Mpa] | 3400 | 3300 | 3200 |
| Evaluation after moisture and heat resistance test (Retention rate) | Heat resistance Tg [° C.] | 349 (98.0%) | 351 (97.5%) | 333 (95.1%) |
| | Bending strength [MPa] | 127 (98.5%) | 128 (98.1%) | 118 (94.4%) |
| | Bending elastic modulus [Mpa] | 3340 (98.2%) | 3230 (97.9%) | 3040 (95.0%) |

The invention claimed is:

1. An epoxy resin which is a polyglycidyl ether that is a polycondensation product of phenol and hydroxybenzaldehyde, the resin comprising a trinuclear body (X) represented by the following Structural Formula (1), with the content of a [o,p,p] bonding body (x1) represented by the following Structural Formula (1-1) among the trinuclear body (X) being in the range of 5% to 18% in terms of an area ratio as measured by liquid chromatography:

[Chem. 1]

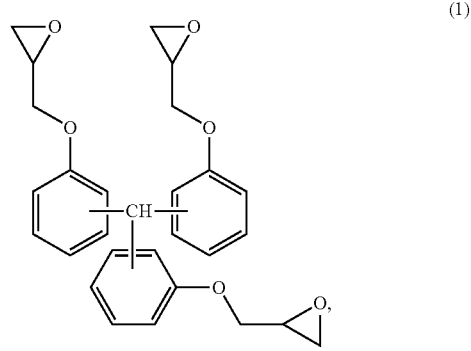

(1)

[Chem. 2]

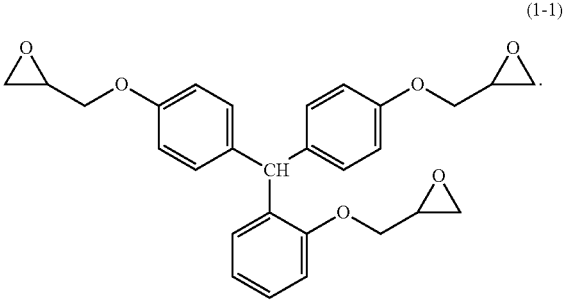

(1-1)

2. The epoxy resin according to claim 1, wherein the content of the trinuclear body (X) in the resin is 70% or more in terms of an area ratio as measured by GPC.

3. The epoxy resin according to claim 1, wherein, of the trinuclear body (X), the content of the [o,p,p] bonding body (x1) represented by the above Structural Formula (1-1) is in the range of 5% to 18% in terms of an area ratio as measured by liquid chromatography, and the content of a [o,o,p] bonding body (x2) represented by the following Structural Formula (1-2) is in the range of 53% to 60% in terms of an area ratio as measured by liquid chromatography:

[Chem. 3]

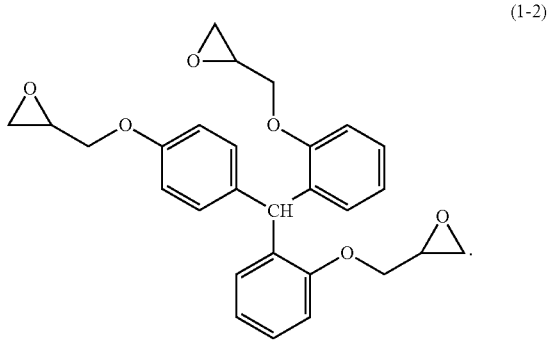

(1-2)

4. The epoxy resin according to claim 1, which has an epoxy equivalent of 160 to 170 g/equivalent.

5. The epoxy resin according to claim 1, wherein the hydroxybenzaldehyde is ortho-hydroxybenzaldehyde.

6. The epoxy resin according to claim 5,
wherein, of the trinuclear body (X), the content of the [o,p,p] bonding body (x1) represented by the above Structural Formula (1-1) is in the range of 5% to 18%, the content of the [o,o,p] bonding body (x2) represented by the above Structural Formula (1-2) is in the range of 53% to 60%, and the content of a [o,o,o] bonding body (x3) represented by the following Structural Formula (1-3) is in the range of 28% to 40%, in terms of an area ratio as measured by liquid chromatography:

[Chem. 4]

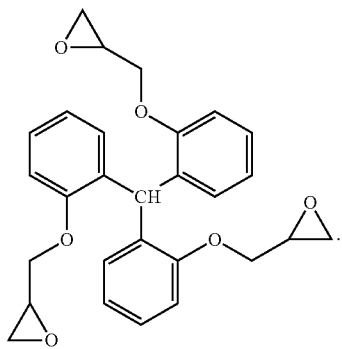

(1-3)

7. A method for producing an epoxy resin according to claim 5 comprising:

reacting phenol with ortho-hydroxybenzaldehyde in a molar ratio between the both (phenol:hydroxybenzaldehyde) being 1:0.05 to 1:0.25 in the presence of an acid catalyst at a temperature condition of 100 to 130° C. to thereby obtain a phenolic resin intermediate; and reacting the obtained phenolic resin intermediate with epichlorohydrin.

8. The epoxy resin according to claim 1, which has a melt viscosity at a temperature of 150° C. of 1 mPa·s to 100 mPa·s.

9. A curable resin composition comprising:

the epoxy resin according to claim 1; and a curing agent.

10. The curable resin composition according to claim 9, wherein the curing agent is any one of an acid anhydride, a dicyandiamide compound, and an aromatic amine compound.

11. A cured product formed by curing the curable resin composition according to claim 10.

12. The curable resin composition according to claim 9, further comprising a reinforcing fiber.

13. A cured product formed by curing the curable resin composition according to claim 9.

* * * * *